(12) United States Patent
Blatchley et al.

(10) Patent No.: US 7,277,842 B2
(45) Date of Patent: Oct. 2, 2007

(54) OVERSCAN HELICAL SCAN HEAD FOR NON-TRACKING TAPE SUBSYSTEMS READING AT UP TO 1X SPEED AND METHODS FOR SIMULATION OF SAME

(75) Inventors: Michael A. Blatchley, Longmont, CO (US); David L. Detro, Longmont, CO (US); Paul Dunn, Longmont, CO (US)

(73) Assignee: Tandberg Data Corporation, Boulder, CO (US)

( * ) Notice: Subject to any disclaimer, the term of this patent is extended or adjusted under 35 U.S.C. 154(b) by 1583 days.

(21) Appl. No.: 09/825,267

(22) Filed: Apr. 3, 2001

(65) Prior Publication Data

US 2001/0022711 A1  Sep. 20, 2001

Related U.S. Application Data

(62) Division of application No. 09/176,013, filed on Oct. 20, 1998, now Pat. No. 6,246,551.

(51) Int. Cl.
*G06F 9/14* (2006.01)
*G11B 15/10* (2006.01)
*G11B 21/04* (2006.01)
*G11B 31/00* (2006.01)

(52) U.S. Cl. .......................... 703/21; 360/137; 360/271

(58) Field of Classification Search ................. 703/21; 360/62; 714/64; 710/52
See application file for complete search history.

(56) References Cited

U.S. PATENT DOCUMENTS 3,821,710 A   6/1974   Arciprete et al.

(Continued)

FOREIGN PATENT DOCUMENTS

DE   29 06 836 A1   9/1980

(Continued)

OTHER PUBLICATIONS

Oehme-W. "Investigation and Modeling of Helical Scan Tape Recorder Noise" IEEE 1994 pp. 72-75.*

(Continued)

*Primary Examiner*—Anthony Knight
*Assistant Examiner*—Thomas H. Stevens
(74) *Attorney, Agent, or Firm*—Law Office of Jessica Costa, P.C.; Jessica Costa

(57) ABSTRACT

A helical scan drum design for use in non-tracking tape devices which assures 70% coverage of a track to be read by overscanning with at least two read heads at approximate 1X speed. The present invention further provides a simulation method for evaluating potential drum designs for such overscan applications. The preferred drum design uses pairs of read heads having identical azimuth angles and positioned on the rotating drum such that in combination they overlap the scan of a track by 130% the track width. These dimensions assure at least 70% coverage of each track by at least one of the pair of heads at up to 1X speed while assuring no overlap with another recorded track recorded along an identical azimuth angle. The simulation method allows for evaluation of potential drum designs by accepting parameters describing the intended drum application and then simulating track read operations over a plurality of simulated tracks to determine the efficacy of the design over a range of tape speeds and gap widths. Designs that simulate successful reading of a sufficient threshold number of tracks over a sufficiently broad range of tape speeds may then be selected for further test and evaluation.

18 Claims, 7 Drawing Sheets

U.S. PATENT DOCUMENTS

| | | | |
|---|---|---|---|
| 3,962,727 | A | 6/1976 | Kamimura et al. |
| 4,011,587 | A | 3/1977 | Arter et al. |
| 4,099,211 | A | 7/1978 | Hathaway |
| 4,106,065 | A | 8/1978 | Ravizza |
| 4,125,881 | A | 11/1978 | Eige et al. |
| 4,172,265 | A | 10/1979 | Sakamoto et al. |
| 4,175,267 | A | 11/1979 | Tachi |
| 4,180,833 | A | 12/1979 | Hirai et al. |
| 4,215,377 | A | 7/1980 | Norris |
| 4,257,075 | A | 3/1981 | Wysocki et al. |
| 4,293,879 | A | 10/1981 | Heitmann et al. |
| 4,322,755 | A | 3/1982 | Kosaka |
| 4,357,639 | A | 11/1982 | Hama et al. |
| 4,390,915 | A | 6/1983 | Matsuyama |
| 4,394,694 | A | 7/1983 | Ninomiya et al. |
| 4,404,605 | A | 9/1983 | Sakamoto |
| 4,412,260 | A | 10/1983 | Stricklin et al. |
| 4,420,778 | A | 12/1983 | Sakamoto |
| 4,467,373 | A | 8/1984 | Taylor et al. |
| 4,484,236 | A | 11/1984 | Wilkinson |
| 4,486,796 | A | 12/1984 | Sakamoto |
| 4,491,886 | A | 1/1985 | Saito et al. |
| 4,492,991 | A | 1/1985 | Osada et al. |
| 4,544,967 | A | 10/1985 | Louth |
| 4,554,598 | A | 11/1985 | Tarbox et al. |
| 4,581,662 | A | 4/1986 | Sato |
| 4,591,924 | A | 5/1986 | Miura et al. |
| 4,609,947 | A | 9/1986 | Yamagiwa et al. |
| 4,614,991 | A | 9/1986 | Murakami |
| 4,620,245 | A | 10/1986 | Shimizu |
| 4,628,372 | A | 12/1986 | Morisawa |
| 4,628,383 | A | 12/1986 | Miyamoto |
| 4,636,873 | A | 1/1987 | Eguchi |
| 4,637,023 | A | 1/1987 | Lounsbury et al. |
| 4,641,210 | A | 2/1987 | Ohyama |
| 4,642,714 | A | 2/1987 | Miyamoto |
| 4,644,414 | A | 2/1987 | Yamada et al. |
| 4,646,169 | A | 2/1987 | Shimpuku |
| 4,651,239 | A | 3/1987 | Omori et al. |
| 4,654,731 | A | 3/1987 | Froschl et al. |
| 4,663,673 | A | 5/1987 | Doutsubo |
| 4,665,447 | A | 5/1987 | Odaka |
| 4,677,504 | A | 6/1987 | Yamazaki et al. |
| 4,680,654 | A | 7/1987 | Shibuya |
| 4,682,247 | A | 7/1987 | Doutsbo |
| 4,688,109 | A | 8/1987 | Sangu |
| 4,703,373 | A | 10/1987 | Oosaka |
| 4,714,971 | A | 12/1987 | Sigiki et al. |
| 4,717,974 | A | 1/1988 | Baumeister |
| 4,731,678 | A | 3/1988 | Takeuchi |
| 4,737,865 | A | 4/1988 | Murakami et al. |
| 4,739,420 | A | 4/1988 | Odaka et al. |
| 4,758,904 | A | 7/1988 | Takahashi et al. |
| 4,758,911 | A | 7/1988 | Nakano et al. |
| 4,760,474 | A | 7/1988 | Takimoto |
| 4,769,811 | A | 9/1988 | Eckberg, Jr. et al. |
| 4,774,605 | A | 9/1988 | Kato |
| 4,786,011 | A | 11/1988 | Fujiwara et al. |
| 4,796,115 | A | 1/1989 | Ohshima et al. |
| 4,799,221 | A | 1/1989 | Fukami et al. |
| 4,802,172 | A | 1/1989 | Fukami et al. |
| 4,812,924 | A | 3/1989 | Fukami et al. |
| 4,821,129 | A | 4/1989 | Culp |
| 4,835,628 | A | 5/1989 | Hinz et al. |
| 4,843,495 | A | 6/1989 | Georgis et al. |
| 4,845,577 | A | 7/1989 | Georgis et al. |
| 4,897,739 | A | 1/1990 | Hasegawa et al. |
| 4,918,546 | A | 4/1990 | Saito |
| 4,930,027 | A | 5/1990 | Steele et al. |
| 4,933,784 | A | 6/1990 | Oldershaw et al. |
| 4,935,824 | A | 6/1990 | Nakano et al. |
| 4,935,827 | A | 6/1990 | Oldershaw et al. |
| 4,970,612 | A | 11/1990 | Renders et al. |
| 4,977,469 | A | 12/1990 | Yokozawa |
| 4,984,104 | A | 1/1991 | Takahashi et al. |
| 5,003,411 | A | 3/1991 | Nagahara et al. |
| 5,034,833 | A | 7/1991 | Marlowe |
| 5,050,018 | A | 9/1991 | Georgis et al. |
| 5,068,757 | A | 11/1991 | Hughes et al. |
| 5,099,375 | A * | 3/1992 | Ishii et al. ............... 360/271.5 |
| 5,103,355 | A | 4/1992 | Steele |
| 5,115,500 | A | 5/1992 | Larsen |
| 5,142,422 | A | 8/1992 | Zook et al. |
| 5,155,641 | A * | 10/1992 | Kubo et al. .............. 360/271.5 |
| 5,191,491 | A | 3/1993 | Zweighaft |
| 5,251,077 | A | 10/1993 | Saitoh |
| 5,262,905 | A | 11/1993 | Takagi et al. |
| 5,327,305 | A | 7/1994 | Thomas |
| 5,349,481 | A | 9/1994 | Kauffman et al. |
| 5,414,570 | A | 5/1995 | Fry et al. |
| 5,442,451 | A | 8/1995 | Hitotsumachi |
| 5,448,439 | A * | 9/1995 | Magnusson et al. ... 360/130.24 |
| 5,535,068 | A | 7/1996 | Hughes |
| 5,602,694 | A | 2/1997 | Miles et al. |
| 5,633,764 | A | 5/1997 | Ohta |
| 5,781,688 | A | 7/1998 | Seong |
| 5,872,997 | A | 2/1999 | Golson |
| 5,953,177 | A | 9/1999 | Hughes |

FOREIGN PATENT DOCUMENTS

| | | |
|---|---|---|
| JP | 56-93157 | 7/1981 |
| JP | 58-133665 | 2/1982 |
| JP | 57-55579 | 4/1982 |
| JP | 59-139157 | 1/1983 |

OTHER PUBLICATIONS

Benson et al., Numerical Simulation of Tape Dyanmics in Helical-Scan Recording. IEEE 1993. pp. 3927-3929.*

Yoneda et al., "Simulation of Tape Glide Characteristics Above VCR with Rotation Part and Static Par" IEEE 1989 pp. 717-727.*

Eshel-A. "Stimulation of Head Contour Effects in Helical Scan Video Recording" Tibology Transactions vol. 34. 1991 pp. 573-576.*

Oehme "Investigation and Modeling of Helical Scan Tape Recorder Noise" 1994 IEEE pp. 72-75.*

* cited by examiner

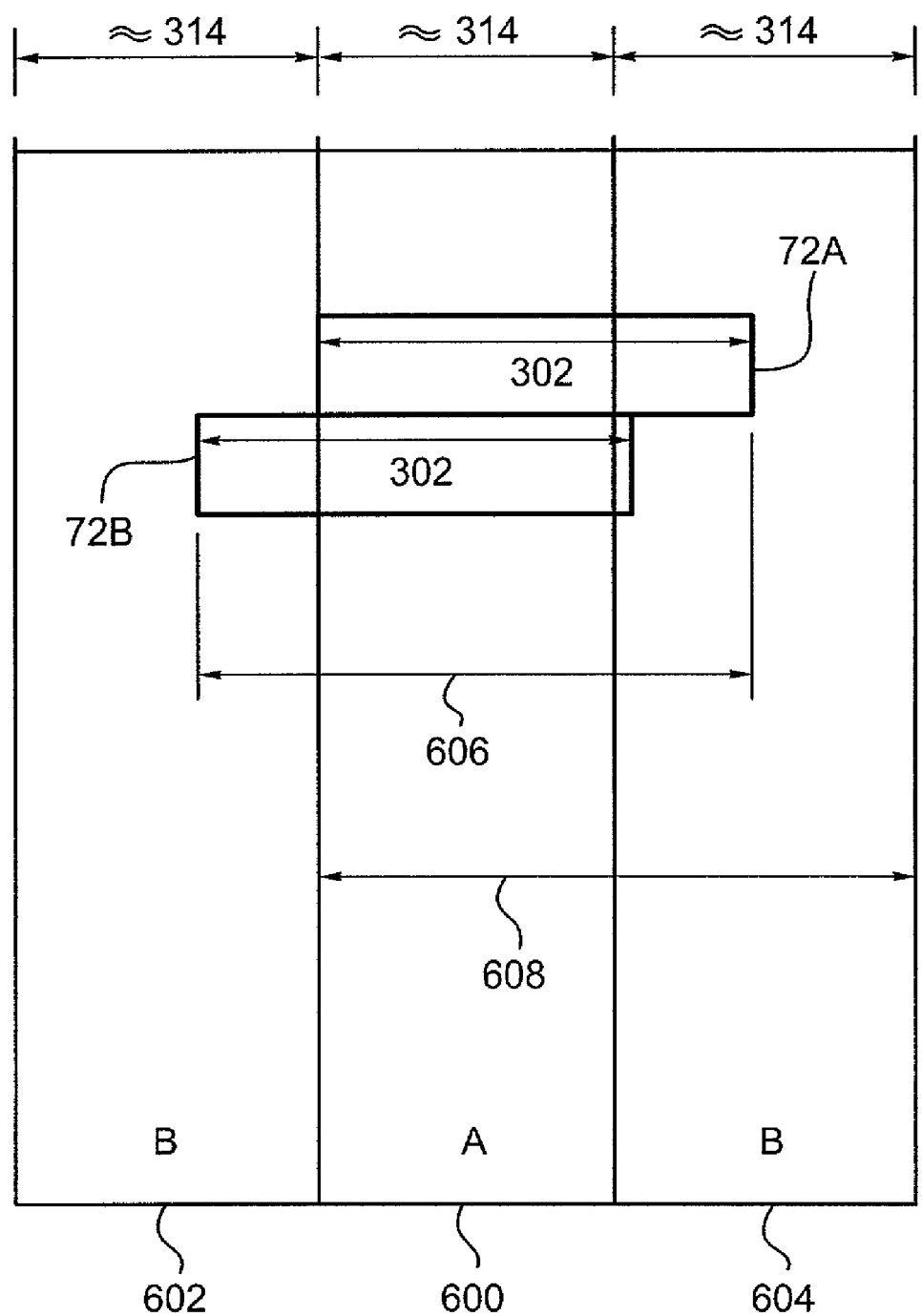

US 7,277,842 B2

OVERSCAN HELICAL SCAN HEAD FOR NON-TRACKING TAPE SUBSYSTEMS READING AT UP TO 1X SPEED AND METHODS FOR SIMULATION OF SAME

CROSS REFERENCE TO RELATED APPLICATIONS

This is a divisional of application Ser. No. 09/176,013 filed on Oct. 20, 1998 now U.S. Pat. No. 6,246,551.

BACKGROUND OF THE INVENTION

1. Field of the Invention

The present invention relates to helical scan tape storage devices and more specifically relates to a helical scan drum design having read heads optimally positioned for reading data in non-tracking tape subsystem. The present invention further relates to simulation methods for optimally designing the placement of read heads on such a drum design.

2. Related Patents

The present invention is related to co-pending U.S. patent application entitled "Variable Speed Recording Method and Apparatus for a Magnetic Tape Drive", invented by Beavers et al., and having Ser. No. 09/176,079, now U.S. Pat. No. 6,307,701, filed concurrently herewith on Oct. 20, 1998, and U.S. patent application entitled "Fine Granularity Rewrite Method and Apparatus for Data Storage Device", invented by Zaczek, and having Ser. No. 09/176,015, now U.S. Pat. No. 6,381,706, filed concurrently herewith on Oct. 20, 1998, and U.S. patent application entitled "Multi-level Error Detection and Correction Technique for Data Storage Recording Device", invented by McAuliffe et al., and having Ser. No. of 09/176,014, now U.S. Pat. No. 6,367,047, filed concurrently herewith on Oct. 20, 1998, all of which are commonly owned and all of which are hereby incorporated by reference.

3. Discussion of Related Art

Tape storage devices are often used in storage applications where high density storage is required and removability of the storage medium is desired. For example, such tape storage subsystems are often used for data archives in computing systems. User and system data stored on a computer system's disk storage subsystem is copied to a tape medium in a tape storage subsystem. The tape medium is removable from the tape storage subsystem and can then be securely stored (for example off site) as a secured archive copy of critical data stored on the computer system's disk storage subsystem.

As computer storage needs have risen, so have demands for high density tape storage subsystems. Early tape storage subsystems stored data in parallel tracks running linearly the length of the tape medium. These systems are often referred to as longitudinal tape subsystems. Both the linear bit density (the density of magnetic flux changes along a single linear track) as well as the track density (the number of tracks placed across the width of the tape medium) affected the total storage density of data on the tape medium.

As physical limits were encountered in design of such linear tape devices, helical scan tape subsystems evolved to further increase tape medium storage densities. This is a recording format in which a relatively slow moving tape is helically wrapped around a rapidly rotating drum with an embedded record head and read head. The tape is positioned at a slight angle to the equatorial plane of the drum. This results in a recording format in which recorded tracks run diagonally across the tape from one edge to the other. The record head rotates past the tape spanning a diagonal from one edge to the other. As the drum rotates, the record head records another diagonal track with more data. Recorded tracks are parallel to each other but are each at an angle to the edge of the tape. This geometry of discrete sized tracks on the magnetic tape medium allows still higher densities of data to be stored on the tape as compared to older linear (longitudinal) tape subsystems.

It is common in helical scan devices to use at least two record heads typically adjacent one another on the circumference of the drum. This allows two parallel helical scan tracks to be recorded during each rotation of the drum. Typically the two heads are referred to as an "A" head and a "B" head, respectively. The tracks recorded by each head are correspondingly referred to as "A" tracks and "B" tracks. "A" tracks are recorded by the "A" head at a first azimuth angle (an offset angle relative to the perpendicular of the angle of the tape relative to the equatorial plane of the drum). The "B" tracks are recorded by the "B" head at a different azimuth angle (typically 20-40 degrees offset from the "A" azimuth angle.

Typical helical scan tape devices also have one or more read heads for reading back the data recorded on the tape medium. The read head receives the magnetic flux changes previously recorded on the tape. Analog and digital electronic circuits then reconstruct the data represented by the recorded flux changes. Where multiple recording heads are used having different azimuth angles, there are corresponding read heads with identical azimuth angles for reading corresponding tracks. In other words, read heads are of the "A" type and "B" type having identical azimuth angles to the corresponding recording heads. Often a single head may serve the dual purpose of a read head and a write head.

Mechanical tolerances for such helical scan devices are extremely critical to proper operation due the higher track and bit densities of the format. The "A" read head must be substantially aligned with the "A" track to successfully read the data. In like manner, the "B" read head must be substantially aligned with the "B" track to successfully read the recorded data. Mistracking is the phenomenon that occurs when the path followed by the read head of the recorder does not correspond to the location of the recorded track on the magnetic tape. Mistracking can occur in both longitudinal and helical scan recording systems. The read head must capture a substantial percentage of the track in order to produce a playback signal. If the head is too far off the track, recorded information will not be played back.

Most helical scan tape devices use complex (hence costly) tracking circuits to assure that the appropriate heads are aligned over the corresponding recorded data. Servo feedback control circuits constantly monitor and control speed of the drum and tape to assure alignment of the heads and the tape. Special servo control data is usually recorded on the tape medium to enable the servo feedback circuits to resynchronize the tracking if the tape is stopped or reverses direction.

It is common to read data immediately after writing the data as a check of the quality of the data writing operation. This process is often referred to as check after write (or CAW). When tracking features are used in a tape device, write operations use the tracking features for speed control of the tape and drum. Read operations in tracking devices use the tracking circuits to precisely position the read head over the written track.

As noted, tracking circuits add significant complexity and associated cost to helical scan tape devices. Some helical scan devices are non-tracking in that they use no such expensive tracking circuits to assure alignment of the heads with the track. Rather, presently known non-tracking tape devices significantly slow the tape speed relative to the drum to permit multiple passes of the read head over the same track. Each pass is at a slightly different longitudinal position on the tape due to the tape movement but because of the slower speed overlaps a portion of the track read by the previous pass. This overlap of sequential passes is often referred to as overscan. To achieve sufficient overscan to assure proper reading of the track by at least one of the read heads, such non-tracking devices reduce the speed of the tape to half of the nominal speed (i.e., half the speed at which the tracks were recorded). This permits a first pass read to overlap a second pass read thereby helping to assure that one of the passes will substantially cover the track width. However, slowing the tape for read operations negatively impacts read operation performance of the tape device.

It is therefore a problem in the art to achieve accurate reading of helical scan tracks on a tape device without resorting to complex, costly tracking circuits and without unduly slowing the performance of the tape device for read operations. In other words, it is desirable to perform overscan read operations on non-tracking tape devices at full speed.

SUMMARY OF THE INVENTION

The present invention solves the above and other problems, thereby advancing the state of the useful arts, by providing a drum design that permits overscan of track read operations at full speed (i.e., at the same speed as corresponding write operations). The present invention further provides a method for determining preferred and optimal geometric design of such a drum using simulation techniques to model the performance of such a helical scan drum.

In particular, the present invention includes a drum design wherein two read heads are positioned on the drum for each type of track. Two "A" type read heads and two "B" type read heads are therefore positioned on the drum. Each of the two "A" heads (referred to herein as A and A') are positioned approximately 180 degrees apart from one another radially around the circumference of the drum. The two "B" type read heads (referred to herein as B and B') are likewise positioned approximately 180 degrees apart from one another around the circumference of the drum. The A and B heads serve as the write heads in write operations. In write operations the A' and B' heads provide a check after write (CAW) function.

Each pair of heads oriented along identical azimuth angles (i.e., being both of type "A" or both of type "B") is separated vertically on the surface of the drum so that each read head passes over a given track with a longitudinal offset relative to one another at nominal tape speed (i.e., at the tape speed used for writing). The width of each head (also referred to herein as head width or gap width) is also selected so as to create an overlap between the two scans of the track by the corresponding two identical type read heads.

The combination of preferred dimensions for the head width and the vertical offset of the heads having identical azimuth angles on the drum surface serve to create a combined coverage of the overlapping scans of greater than 100% of the entire recordable area of the tape medium. In addition, it is critical that the dimensions chosen are adequate to provide sufficient coverage of an appropriate type track such that the recorded data can be sensed. Yet, the width must not be so wide as to overlap another track recorded along an identical azimuth angle in a single scan. Further, the drum of the present invention is intended for use in a variable speed tape device devoid of complex tracking circuits. Therefore, the selected dimensions need to assure adequate coverage at a broad range of tape speeds up to the write operation nominal speed (referred to herein as 1X speed) as well as lower speeds.

A broad range of dimensions and geometric placements of the heads on the drum are possible and it is difficult to easily determine the preferred dimensions for a particular application. A further aspect of the present invention is therefore a simulation model that aids a drum designer in selecting preferred dimensions and head placements for a particular application. The simulation model of the present invention accepts a number of parameters describing the desired tape device and then simulates the coverage of each track over a plurality of simulated track read operations (simulated motion of the tape and drum). The number of simulated tracks is selected to provide a statistically meaningful determination of the efficacy of the selected drum parameters for reading tracks over a length of tape medium.

The simulation model of the present invention then computes the coverage of the read heads over the simulated tracks by determining the geometric dimensions of the heads' motion over the tracks (ignoring analog imperfections such as magnetic media flaws). The same simulation is run for a range of tape speeds, a range of head widths (gap widths) and a range of physical offsets for heads having identical azimuth angles. Other parameters of the simulation may also be varied such as the number of heads having identical azimuth angles, etc.

The number of successful simulated track reads is then plotted in a graph according to the variables of the selected drum design. A track is considered successfully read where all portions of the track are adequately covered by any of the heads. Each portion may be covered by any of the heads on a single scan or over multiple scans. A range of usable drum dimensions is then readily visible to a designer in accordance with the plotted output. A small range of possibly usable drum dimensions can then be selected for further implementation and design verification.

In a first aspect of the invention a method is provided for evaluating parameters of a drum design for use in a helical scan tape device. The method includes receiving simulation parameters describing, inter alia, head positions on the drum to be evaluated. The method then simulates the reading of a track by calculating the geometric area a read head would cover as it scans over the track. The method then determines the amount of overlap of the geometric area as a percentage of the area defined by the dimensions of the track. Such a simulated read is then determined to be successful when the percentage is greater than a predetermined coverage threshold value. The steps are repeated for a number of simulated tracks to evaluate the performance over a length of simulated tape medium. Lastly, the method determines if the parameters are effective for a drum design based on the number of successful and failed simulated reads as compared to predetermined threshold values.

In a second aspect of the invention, a helical scan drum is provided for use in non-tracking tape storage subsystem. The drum has a first and second read head on its circumference. The second read head is positioned on the drum such that it overscans a track following the first read head within a single rotation of the drum. Also, the second read head is positioned on the drum such that the area read by at least one of the two read heads covers the area of the track by at least a predetermined coverage threshold value. In certain circumstances such as misaligned tracks on the tape medium, the heads on the rotating drum may read portions of a single track over multiple rotations. Further, if tape speed is slowed by the tape controller, such as when a host computer cannot accept data at full speed, portions on a single track may be scanned multiple times over multiple rotations. Similarly at slower tape speeds each drum rotation may cause the heads to scan portions of multiple tracks. In all cases, the heads are positioned on the drum to assure at least 100% scan coverage of the entire recording area of the tape medium by the multiple heads on the rotating drum.

These and other objects, features and advantages of the present invention will be apparent from the following description and associated drawings.

BRIEF DESCRIPTION OF THE DRAWINGS

FIG. 6 is a schematic diagram of tracks on a tape medium and the relative combined coverage of heads across those tracks.

DETAILED DESCRIPTION OF THE PREFERRED EMBODIMENTS

Figure 1:
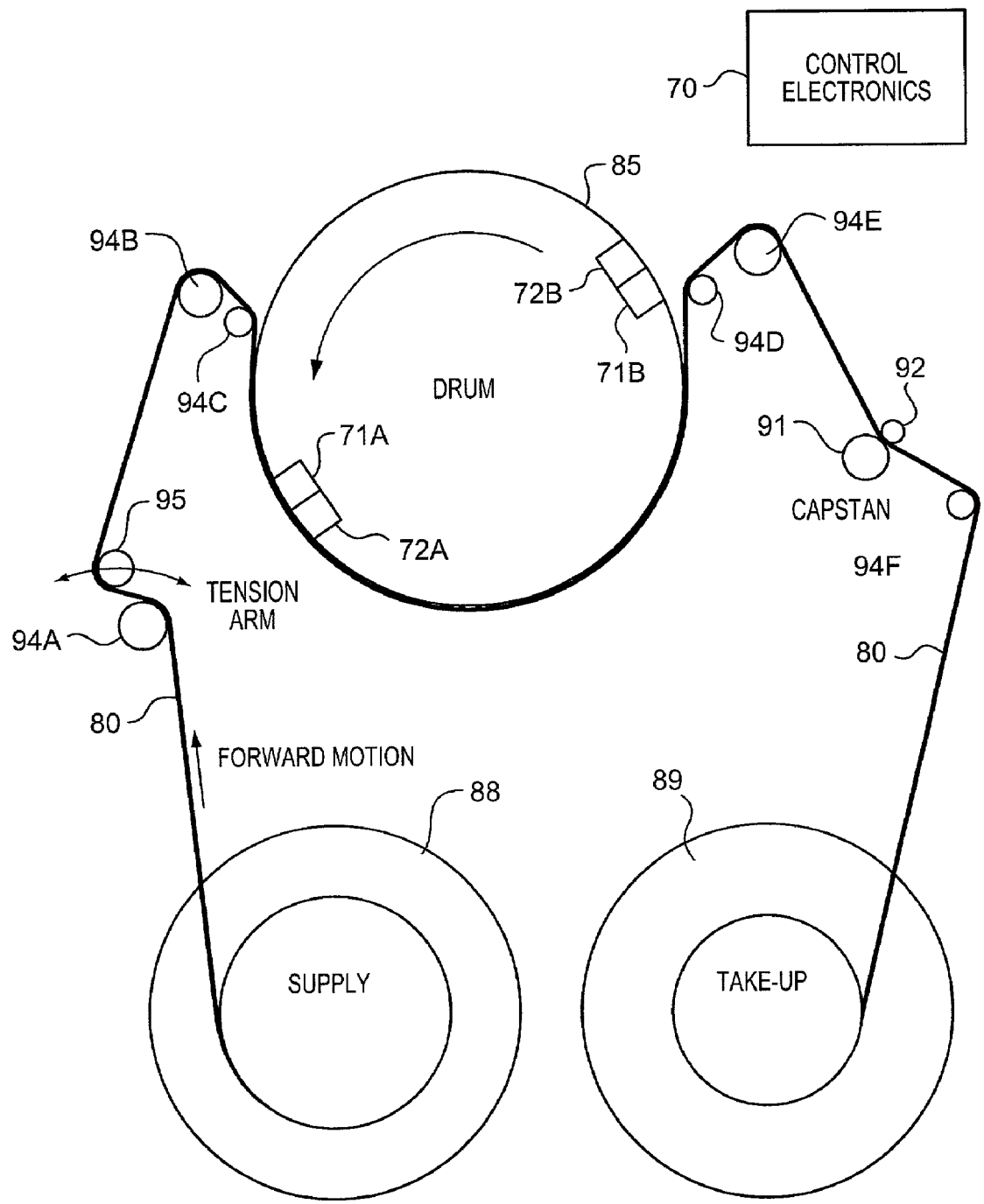
FIG. 1 is a block diagram of a typical helical scan tape device.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

1X Speed Overscan Drum

FIG. 1 is a block diagram of a tape device having a helical scan drum in accordance with the present invention. Drum 85 includes two pairs of read heads, type A read heads 72A and 72B and type B read heads 71A and 71B. Tape medium 80 is fed from a supply spool 88 through the tape mechanism to a take-up spool 89. Typically, the two spools are housed within a cartridge for user convenience of handling and to protect the tape medium from inadvertent damage or contamination.

The tape medium 80 is threaded through the tape device by a plurality of tape guides 94A-F. Capstan 91 and opposing pinch roller 92 feed the tape at a desired speed. Other motors (not shown) drive the supply spool 88 and take-up spool 89 as required to advance or rewind the tape medium in conjunction with the capstan 91. Tension arm 95 is a spring biased device to maintain relatively constant tension on the tape medium to avoid excessive slack.

Control electronics 70 senses operation of the components and controls the motion of the tape medium. In addition, electronics 70 reads and writes information on the tape medium via the read heads 71A-B and 72A-B (typically one of the read heads serves a dual purpose of both reading and writing the tape medium).

As is known in the art of helical scan tape devices, drum 85 is positioned within the tape device such that tape medium 80 typically wraps around between 90 and 180 degrees of the circumference of drum 85. Further, the drum 85 is positioned at an angle relative to the tape medium 80 such that tracks are written at an angle on the tape medium 80 extending from one edge to the other.

Figure 2:
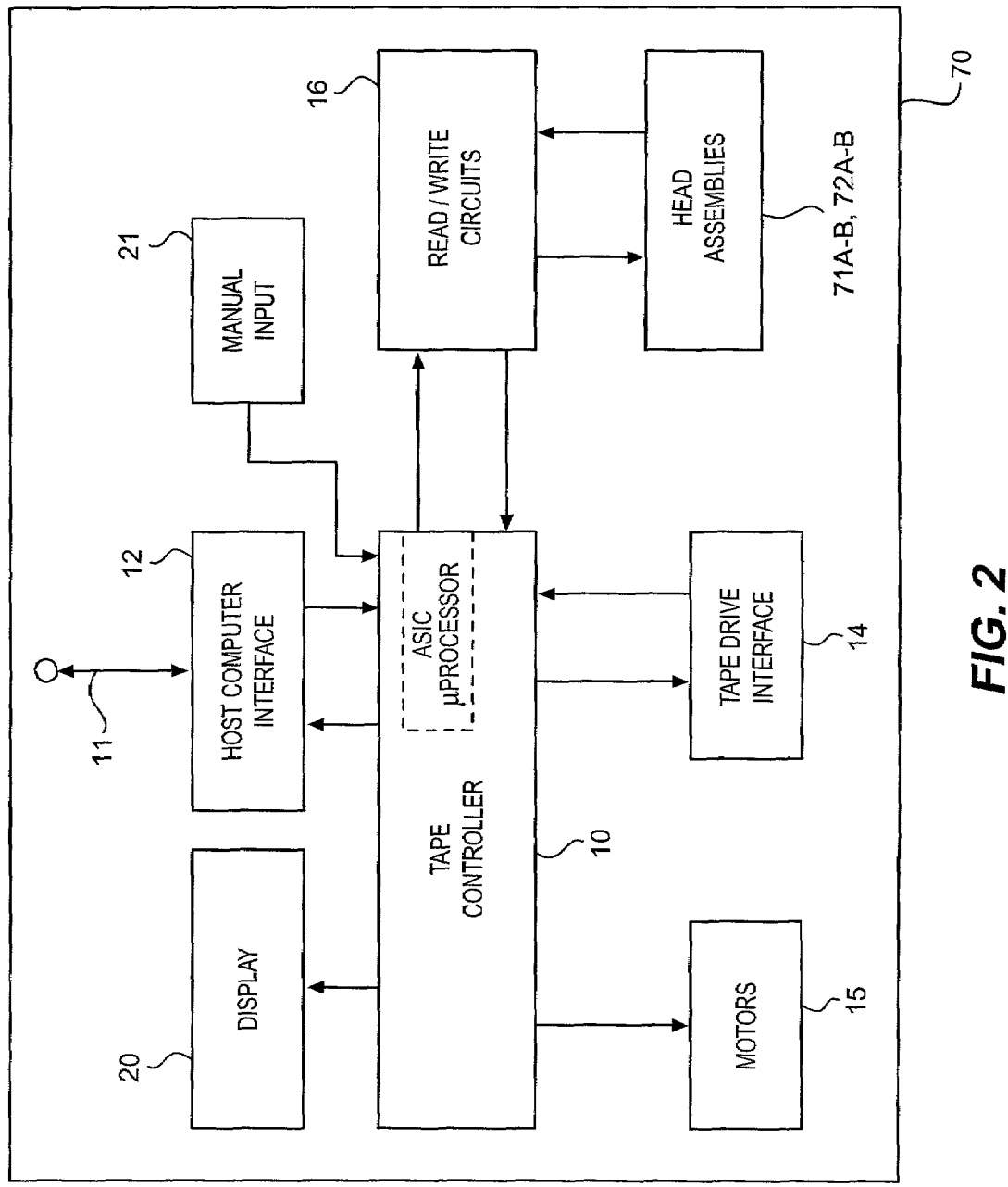
FIG. 2 is a block diagram of control electronics associated with a tape device of FIG. 1.

FIG. 2 is a block diagram showing major functional elements of control electronics 70. Tape controller 10 performs most overall control functions of the components of the tape device. As well as data encoding and decoding of data on the tape medium. Tape controller 10 is preferably implemented as an application specific integrated circuit (ASIC) and a general purpose CPU as well as numerous special purpose circuits for controlling the tape device components.

Operator interfacing is controlled by tape controller 10 via manual input element 21, interface 12 and display 20 coupled to tape controller 10. Tape controller 10 encodes and decodes data stored on, and retrieved from, the tape medium. Read/write circuits 16 couple head assemblies 71A-B and 72A-B to tape controller 10. Tape controller 10 also manages operation of the various motors and interface elements of the tape device via motor controls 15 and tape drive interface 14.

Figure 3:
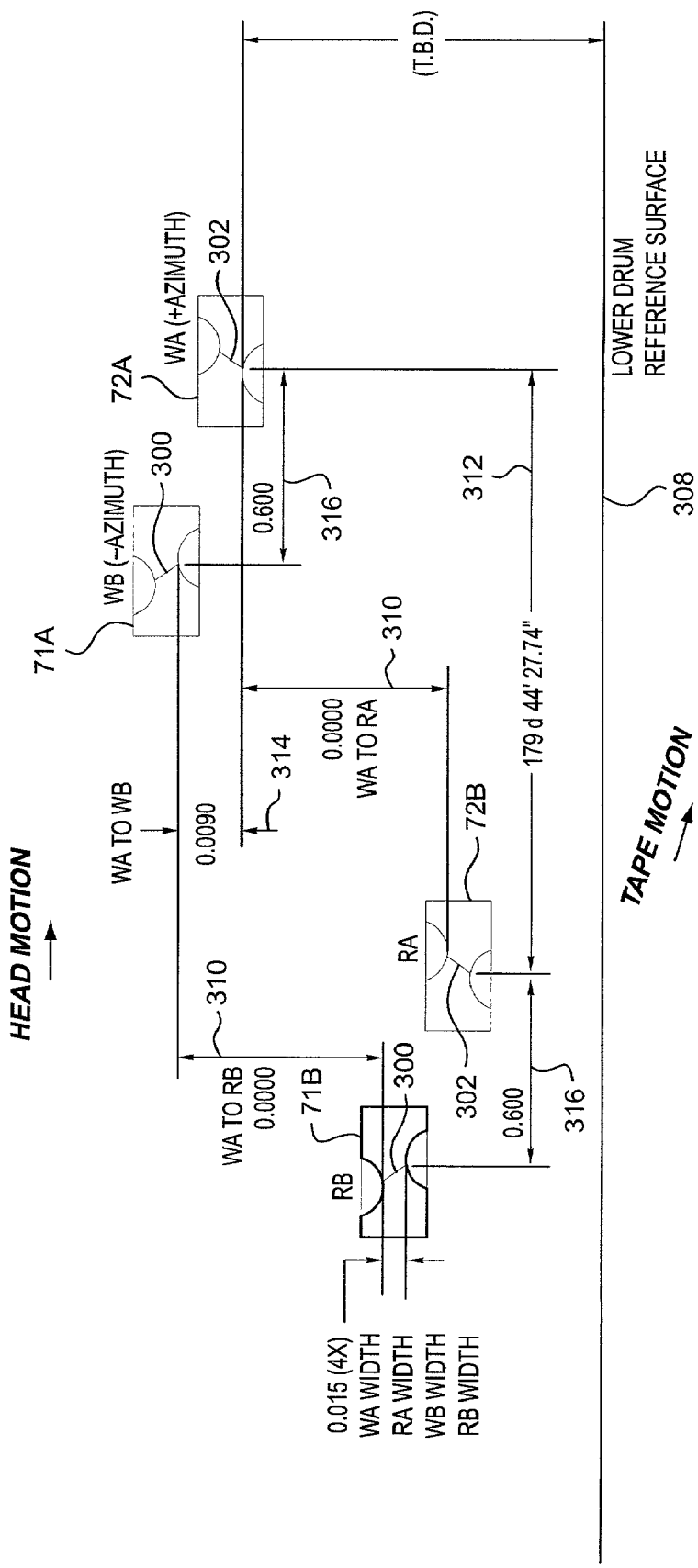
FIG. 3 is a block diagram indicating dimensions of the preferred head positioning on a drum in accordance with the present invention.

FIG. 3 is a block diagram describing the dimensions of a preferred exemplary embodiment of a drum designed in accordance with the present invention. FIG. 3 shows two pairs of read heads. A first pair, 71A and 71B, read type B tracks written at the type B azimuth angle 300. A second pair, 72A and 72B, read type A tracks written at the type A azimuth angle 302. A first head of each pair, namely 71A and 72A, preferably serve as both read heads and write heads. In write operations the write heads 71A and 72A induce magnetic flux changes on the tape medium (not shown) to store data thereon. In read operations, all four heads 71A-B and 72A-B, sense previously recorded magnetic flux changes to retrieve data previously recorded on the tape medium.

Preferred dimensions for placement of the heads on the drum are shown in FIG. 3. All dimensions are expressed in millimeters with the primary reference being the lower drum surface 308. Those skilled in the art will recognize the criticality of tight tolerances on such high speed, high density storage devices. The dimensions shown are exact for a particular application. Each application may have unique dimensions and associated tolerances. Critical dimensions in the operation of the drum of the present invention for purposes of overscanning are those that determine the offsets between pairs of heads having identical azimuth angles. In other words, dimensions determining the relative positions of heads 71A and 71B are critical to the overscan reading of type B tracks. Identical dimensions are used in setting the relative positions of heads 72A and 72B to assure accurate overscan reading of type A tracks.

Figure 5:
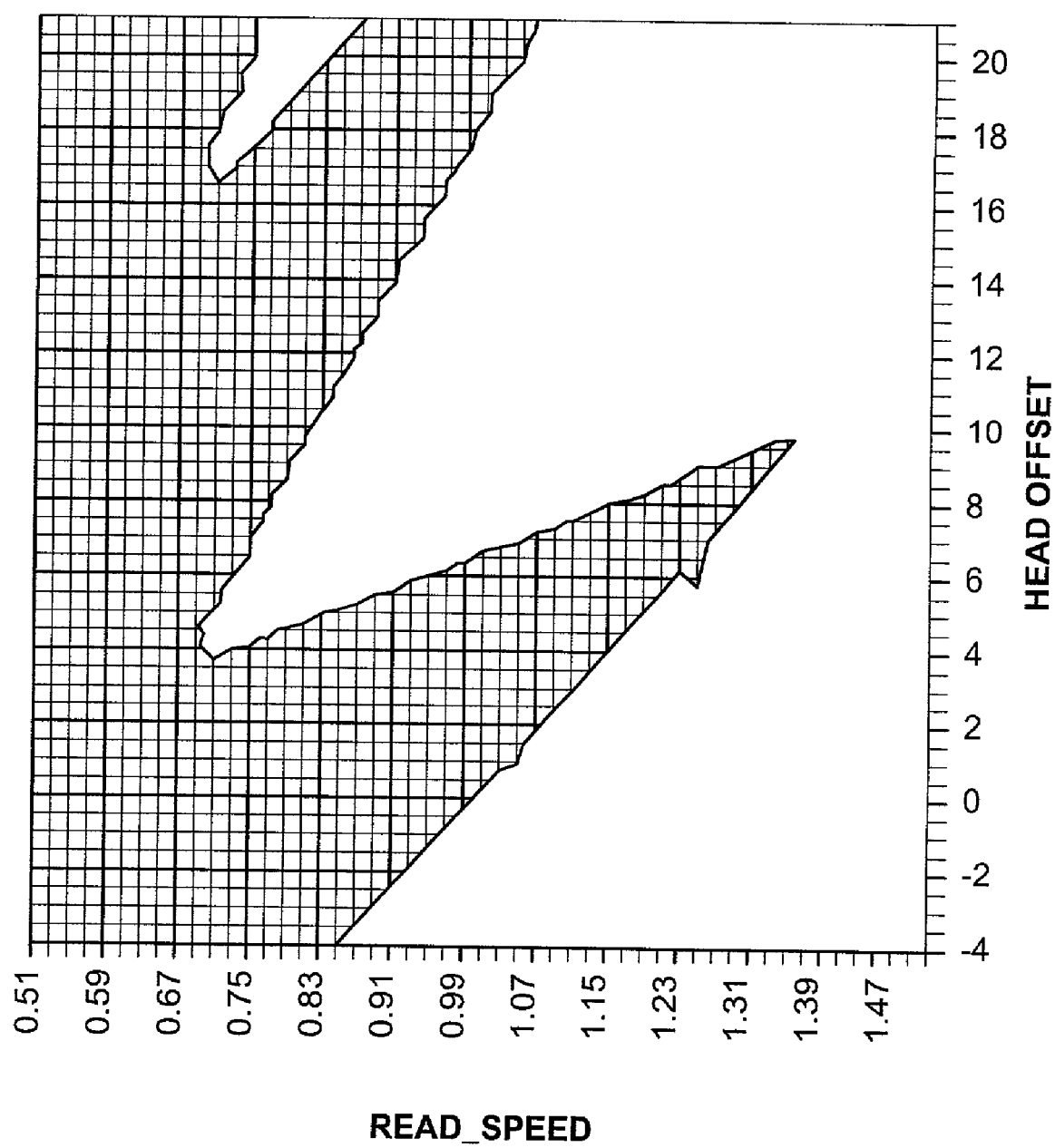
FIG. 5 is an exemplary plot generated by the simulation methods of the present invention depicting viability of various drum design parameters.

The critical dimensions for performing useful overscan reading of tracks by a pair of heads having identical azimuth angles include: the head spacing 310, the radial offset 312 and the gap width 302. As noted above, in the preferred embodiment, identical dimensions are used to positions the type B read heads relative to one another. Relative positioning of type A heads and type B heads is determined primarily by vertical offset 314 and the radial offset 316. These dimensions are determined in accordance with the nominal track width and any gap desired between adjacent tracks recorded along different azimuth angles. The plot of FIG. 5 shows useful ranges of head offset spacing values and tape speeds for gap widths of 15 microns and track spacing of 9 microns.

The head positioning of dual read heads for each type of track enables the drum of FIG. 3 to perform overscan reading of helical scan tracks at full speed (also referred to herein as 1X speed or writing speed) without the need for complex tracking control circuits and mechanisms within the tape device. Rather, the above dimensions help assure that, between the two heads, all portions of a particular track will be adequately covered at speeds up to 1X. The two heads for each azimuth type overlap one another to a degree that their combined area (their effective coverage) of scan is greater than approximately 100% of the track pair width (the sum of the widths of adjacent A and B tracks). It is also critical that the gap width of each head is not so large as to span from one track to another track recorded along an identical azimuth angle.

FIG. 6 is a schematic diagram of a type A track 600 with adjacent type B tracks 602 and 604 on each side. Type A heads 72A and 72B are shown schematically as they would overlap their individual scan coverage to provide an effective coverage area 606 having a width of greater than approximately 100% of the width 608 of the track pair 600 and 604. Individually, each head 72A and 72B has a head width dimension 302 associated therewith as shown on FIG. 3. In addition, the track width of tracks 600, 602 and 604 is in large part determined by the offset 314 between corresponding A and B heads. Tape speed within the tape device also contributes to the track width. Further, head offset spacing dimension 310 of FIG. 3 is not easily shown in FIG. 6 in that the spacing dimension also involves a time elements as the drum rotates the A' or B' head over the track. This dimension is therefore not meaningful on the static view presented in FIG. 6.

Simulation Methods

A range of critical dimensions may be effective for particular applications to enable 1X tape speed for read operations on non-tracking tape devices. A number of variables and factors enter into the evaluation of the efficacy of a particular overscan drum design. A designer may attempt to discover a preferred design by trial and error testing a large number of head positions but such design techniques are time consuming and costly. Simulation techniques are employed in design of the preferred drum described above. The simulation accepts a number of parameters of the simulation. Examples of such parameters include: tape speed, number of heads, gap width and head spacing. Other parameters may be defined to alter the threshold values used to determine efficacy of the drum design as these design parameters are altered in the simulation. Those skilled in the art will recognize a variety of other factors that may be employed to simulate a drum design and to evaluate its efficacy.

Figure 4A:
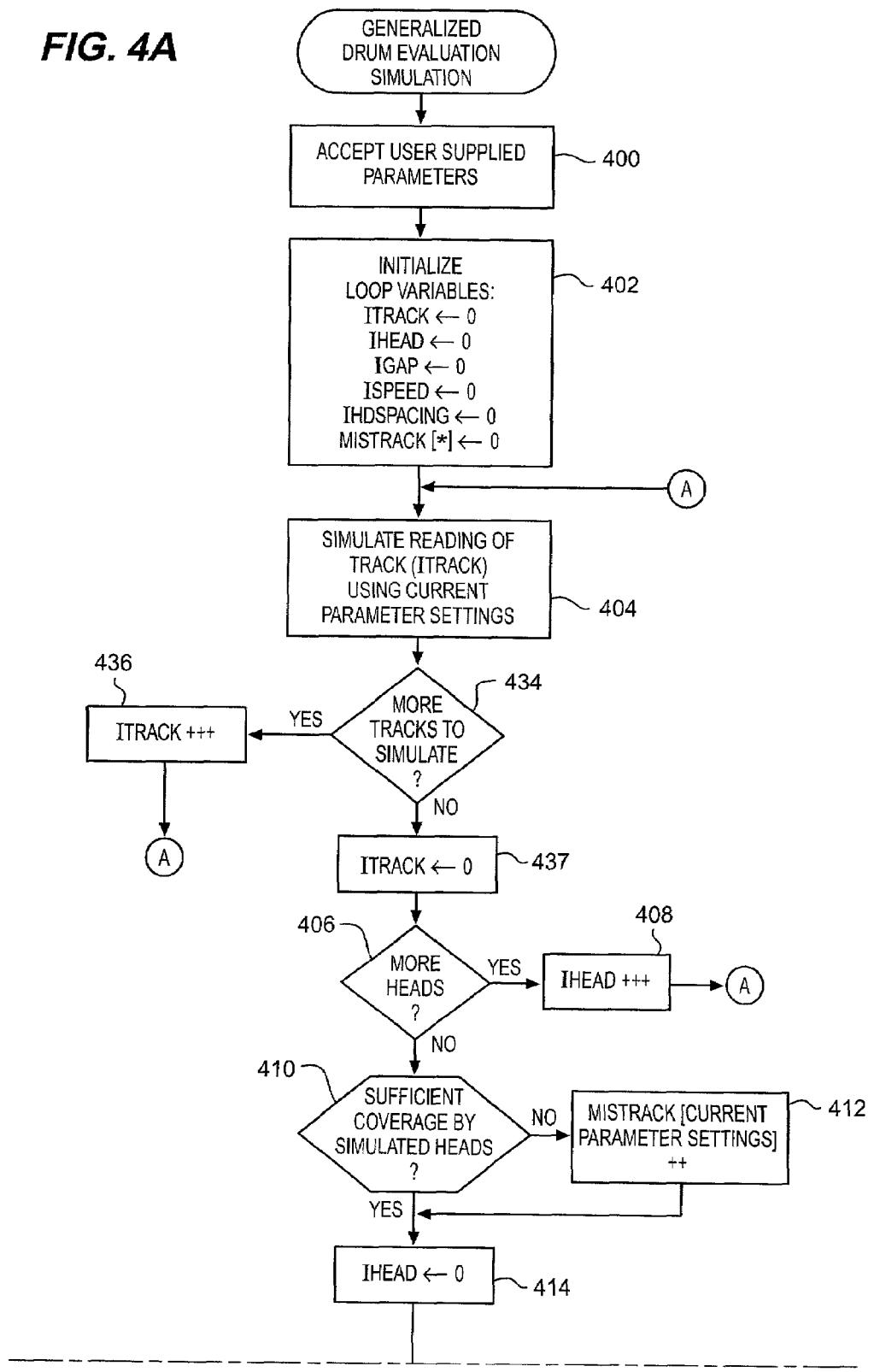
FIGS. 4A and 4B are flowcharts describing an exemplary embodiment of the simulation method of the present invention for evaluating potential drum designs.
Figure 4B:
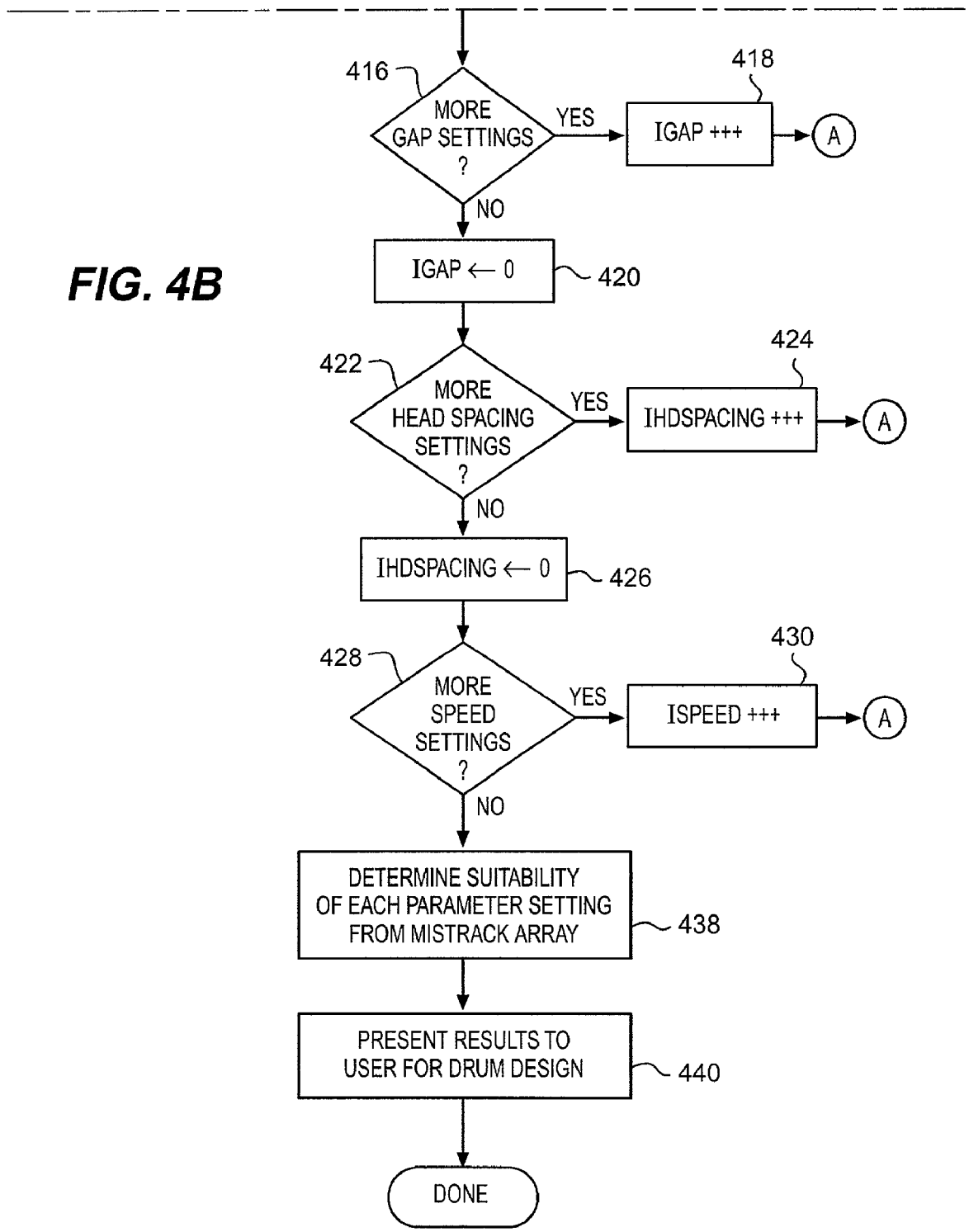

The present invention includes mathematical simulation techniques which simulate the use of a particular drum design on a particular tape device. FIGS. 4A and 4B are a flowchart describing a generalized implementation of the simulation methods of the present invention. This generalized embodiment processes a number of parameters for simulating a variety of tape device applications and drum designs. In the preferred embodiment discussed further below, a somewhat simpler set of parameters are processed to evaluate a narrower range of likely design options.

Element 400 is first operable to accept a number of design parameters from a user of the simulation. The design parameters describe limits and ranges of values to be evaluated in identifying a usable set of parameters for a drum design. In this generalized embodiment, the parameters to be varied and evaluated by simulation include: the number of read heads, the gap width of the read heads, the tape speed and the offset spacing between all tape heads. In addition, the number of tracks for which the simulation is to run is provided as a control over the duration of the simulation and the statistical base of simulated track reads.

Element 402 is next operable to initialize various loop index local variables to cycle through permissible ranges of options of each parameter of the simulation. In particular, a track index variable (ITRACK), a head index variable (IHEAD), a gap width index variable (IGAP), a tape speed index variable (ISPEED) and a head offset spacing index variable (IHDSPACING) are all initialized to zero. Elements 404 through 436 are then operable iteratively to simulate track read operations using overlapping read heads in accordance with the permissible range of parameter values. The above index variables are used to identify a parameter setting to be used in the subsequent simulated read operations. The tuple represented by the present values of each of the index variables is referred to herein below as the present parameter set.

Element 404 is next operable to simulate the reading of a track using the present parameter set. As discussed further herein below, the read of a simulated track by a simulated head is performed by calculating the geometric area covered by the track and the head (each essentially a rectangular area). The geometric area covered by the track and by the head is essentially its present physical position relative to the rotating drum. This is computed from the provided parameters including the tape speed parameter. The geometric area scanned by the read head is essentially the rectangular area swept by the read head as it rotates on the simulated drum over the present physical location of the track. The overlap between the two rectangular geometric areas, the track area and the head scan area for all heads, determines the success or failure of the read operation as noted below. Element 404 is operable to compute the geometric areas of the track and the head in accordance with the present parameter set.

Element 434 is then operable to determine if more tracks remain to be simulated as specified by the user supplied parameters. If so, element 436 is operable to increment the ITRACK index variable and processing continues by looping back to element 404. If not, processing continues with element 437 to reset the ITRACKS index variable to zero. Processing then continues with element 406.

Element 406 then determines if additional heads are to be processed. The parameters provided by the user include a number of heads to be simulated. If more heads remain to be simulated, element 408 is next operable to increment the IHEAD index variable in the present parameter set and to loop back to element 404.

If no further heads remain to be processed, element 410 is next operable to determine whether the simulated read by all desired simulated heads provided sufficient coverage of the simulated track. In other words, as discussed further herein below, if every portion of the simulated track is covered by any single head or combination of heads of the simulated heads to a sufficient threshold level of coverage, then the simulated track read was successful. If not, the simulated track read failed. The coverage of the track by a head is determined, as noted above and as discussed further below, by the degree of overlap of the geometric areas computed for each. The threshold value to determine success or failure may also be provided as a parameter of the simulation. A preferred value for the coverage varies based on performance characteristics of the selected read/write circuit (16 of FIG. 1). A typical threshold value for read channels in commercially available magnetic storage devices is 60-70%.

As noted herein, each head may provide adequate coverage for portions of a track and not for other portions of a track. Further, each head may cover portions of a track on one rotation and other portions of that track on a subsequent rotation. The combined geometric area, as used herein, therefore means the union of all coverage by all heads over all portions of the tracks. In other words, for each portion of a track, so long as any of the heads of identical azimuth for that track adequately covers that portion, that portion is deemed to be covered by the combined geometric area of the scanning of all heads. If a sufficient percentage of portions of a track are so adequately covered by the combined geometric area of the scanning heads, then the track is adequately covered by the combined geometric area of the scanning heads.

If the simulated track read failed, element 412 is next operable to increment a counter corresponding to the present parameter set indicative of a failed read. A multidimensional array of such counters is provided such that the count may be recorded for each parameter setting of the parameter set. In case of success or failure of the simulated read, processing continues with element 414 to reset the IHEAD index variable to zero in preparation for another parameter setting of other parameters.

Element 416 is then operable to determine if more head gap settings remain to be processed as specified by the user supplied parameters. If so, element 418 is operable to increment the IGAP index variable and processing continues by looping back to element 404. If not, processing continues with element 420 to reset the IGAP index variable to zero in preparation for another parameter setting.

Element 422 is then operable to determine if more head offset spacing values remain to be processed as specified by the user supplied parameters. If so, element 424 is operable to increment the IHDSPACING index variable and processing continues by looping back to element 404. If not, processing continues with element 426 to reset the IHDSPACING index variable to zero in preparation for another parameter setting.

Element 428 is then operable to determine if more tape speed values remain to be processed as specified by the user supplied parameters. If so, element 430 is operable to increment the ISPEED index variable and processing continues by looping back to element 404. If not, processing continues with element 438 to evaluate the usability of the various parameter settings. A particular parameter set is useful if the number of failed reads is less than a threshold percentage of the number of track reads simulated. The threshold value for determining a useful parameter set is determined by the designer's application. Typically success rates of 99% are considered acceptable (i.e., failure rates of less than 1%).

Those skilled in the art will recognize that the flowcharts of FIGS. 4A and 4B are intended as exemplary of a generalized simulation function. Additional or fewer parameters may be used in the simulation. The order of the loop nesting above as to which parameters vary most frequently may be altered. Such design choices as these are well known to those skilled in the art.

The following Matlab listing describes the preferred embodiment for simulating the design of a drum in accordance with the present invention. Matlab is a commercially available computational software library that allows a designer to easily construct and manipulate a simulation program such as the above described general solution. In the preferred embodiment, a free software package called GNU Octave provides a high level language, primarily intended for numerical computations. It is a free software product distributed under the GNU General Public License and available from the Free Software Foundation. The package was developed in part by John W. Eaton at the University of Wisconsin Madison in the Department of Chemical Engineering. The package is widely available on the Internet.

```
% This function computes a vxa_plot for the parameters passed in
% from a controlling script.
% These parameters are described fully in vxa_inputs.m
% The return information is a series of hX_vxa_plot's for each read head
(X=1,2,3,4, . . . ) .
function [h1_vxa_plot, . . .        % note, caw_coverage is returned in this
position when doing that SIM
        h2_vxa_plot, . . .
        h3_vxa_plot, . . .
        h4_vxa_plot, . . .
        h5_vxa_plot, . . .
        h6_vxa_plot, . . .
        h7_vxa_plot, . . .
        h8_vxa_plot, . . .
        h9_vxa_plot, . . .
        h10_vxa_plot] = vxa(write_heads, . . .
                    read_heads, . . .
                    tape_speed_write, . . .
                    tape_speed_read, . . .
                    speed_wrat, . . .
                    drum_angle_static, . . .
                    drum_diameter, . . .
                    drum_rpm_write, . . .
                    drum_rpm_read, . . .
                    track_rotational_length, . . .
```

-continued

```
                           on_track_percentage, ...
                           number_of_simulation_track_groups, ...
                           number_of_track_packets, ...
                           number_of_track_groups_pad, ...
                           caw_simulation)
%disp ("---------- sim start -------")
%write_heads
%read_heads
%tape_speed_write
%tape_speed_read
%speed_wrat
%drum_angle_static
%drum_diameter
%drum_rpm_write
%drum_rpm_read
%track_rotational_length
%on_track_percentage
%number_of_simulation_track_groups
%number_of_track_packets
%number_of_track_groups_pad
%
###############################################################################
#########################
% Spatial calculations
% All calculations ending in _X or _Y are using a coordinate system
% relative to the lead edge of the tape.
% X-axis is along the lead edge of the tape, increases in the
% direction of newly written tracks
%    (increases as tape moves by drum)
%    (increases with increasing track numbers)
% Y-axis is perpendicular to lead edge, increases from lead edge
% of tape to upper edge of tape
% A variable ending in _XY is calculated in this coordinate system
%
% All calculations ending in _XW or _XY are using a coordinate
% system relative to the written tracks
% XW-axis is along the direction a track's width
% YW-axis is paralell to a written track
% if tape_speed_read == tape_speed_write, simulation will
% line everything up perfectly and return 100% packets read
if ((tape_speed_read == tape_speed_write) & caw_simulation ~=1),
    error("vxa: error, tape_speed_read equals tape_speed_write. vxa results
will be incorrect.");
end
% Round number of simulation track groups up to next integer
number_of_simulation_track_groups=ceil(number_of_simulation_track_groups);
% Add write heads to list of available read heads
% nope, don't do it . . . require user to pass in complete list of read heads!!
read_heads=[write_heads ; read_heads];
    [number_read_heads,i1]=size(read_heads);
    [number_write_heads,i1]=size(write_heads);
% Put first write head at 0u vertical position
    head_position_shift=write_heads(1,3);
    write_heads(:,3)=write_heads(:,3)-head_position_shift;
    read_heads(:,3)=read_heads(:,3)-head_position_shift;
% Put first write head at 0-degree rotational position
    head_position_shift=write_heads(1,2);
    write_heads(:,2)=write_heads(:,2)-head_position_shift;
    read_heads(:,2)=read_heads(:,2)-head_position_shift;
% Convert micron (u) inputs to (mm)
    write_heads(:,3:4)=write_heads(:,3:4)*.001;
    read_heads(:,3:4) =read_heads(:,3:4)*.001;
% Calculate drum rotational parameters
    drum_T_write=60/drum_rpm_write;      % (sec) drum rotational period
    drum_T_read =60/drum_rpm_read;       % (sec) drum rotational period
% Calculate drum velocity parameters
    drum_velocity_write=(drum_rpm_write/60)*(drum_diameter*pi);   % (mm/sec)
    drum_velocity_read =(drum_rpm_read/60) *(drum_diameter*pi);   % (mm/sec)
    drum_velocity_write_X=drum_velocity_write*cos(deg2rad(drum_angle_static));
    drum_velocity_write_Y=drum_velocity_write*sin(deg2rad(drum_angle_static));
    drum_velocity_read_X=drum_velocity_read*cos(deg2rad(drum_angle_static));
    drum_velocity_read_Y=drum_velocity_read*sin(deg2rad(drum_angle_static));
% Calculate dynamic scan angles relative to Tape lead edge
    ht_velocity_write_X   =drum_velocity_write_X-tape_speed_write;
    ht_velocity_write_Y   =drum_velocity_write_Y;
    ht_velocity_write_XY =sqrt(ht_velocity_write_X^2+ht_velocity_write_Y^2);
    ht_velocity_read_X =drum_velocity_read_X-tape_speed_read;
    ht_velocity_read_Y =drum_velocity_read_Y;
    ht_velocity_read_XY=sqrt(ht_velocity_read_X^2+ht_velocity_read_Y^2);
```

```
% Calculate written track angle during WRITE mode using
% physical tape coordinate system
    scan_angle_write_XY=rad2deg( atan(ht_velocity_write_Y/ht_velocity_write_X)
);
% Calculate scan angle during READ mode using physical tape coordinate system
    scan_angle_read_XY=rad2deg( atan(ht_velocity_read_Y/ht_velocity_read_X) );
% Calculate linear tape motion during 360-deg of drum rotation
    tape_motion_360_write_X=tape_speed_write*drum_T_write;             %
(mm)
    tape_motion_360_read_X =tape_speed_read*drum_T_read;               %
(mm)
% Calculate amount of tape (across track width!!) that moves by
% in 360-degrees of rotation during writing
    track_pitch_write_360_XW=cos(deg2rad(90-
scan_angle_write_XY)) * (tape_motion_360_write_X);         % (mm)
% Calculate amount of tape (across track width!!) that moves by
% in 360-degrees of rotation during reading
    track_pitch_read_360_XW=cos(deg2rad(90-
scan_angle_read_XY)) * (tape_motion_360_read_X);           % (mm)
% Calculate written track pitch for pair/triplet/etc. (i.e.
% from one drum write rotation to another)
    track_pitch_write_XW=track_pitch_write_360_XW*speed_wrat;          %
(mm)
% Calculate all written and trimmed track widths
track_width_write_XW=diff(write_heads(:,3))+diff(write_heads(:,2))*track_pitch
_write_360_XW/360;
    track_width_write_XW=[track_width_write_XW' track_pitch_write_XW-
sum(track_width_write_XW)]; % calculate width of track trimmmed by next write
scan
% Calculate written track length
track_length_write_YW=ht_velocity_write_XY*drum_T_write*track_rotational_lengt
h/360;    % (mm) length of track
% ########################################### Write Tracks
% Calculate length of tape used
tape_used_X=(number_of_track_groups_pad+number_of_simulation_track_groups+numb
er_of_track_groups_pad) . . .
              *speed_wrat*drum_T_write*tape_speed_write;
% (mm) length of tape used
%Calculate _YW coordinates for the center of each packet to write
    packet_numbers=1:number_of_track_packets;
    packet_rotational_coordinate_YW=(packet_numbers-
0.5)*track_rotational_length/number_of_track_packets;          % (deg)
% ########################################### CAW Coverage Scans
if (caw_simulation==1),
    caw_coverage=zeros(number_read_heads,speed_wrat);
    for rh=1:number_read_heads,
        head_type=read_heads(rh,1);
        trail_edge_XW=sum(track_width_write_XW(1:head_type))-
track_pitch_write_XW* (0:50); % build trail edge vector for written tracks of
same type azimuth
        lead_edge_XW=trail_edge_XW-track_width_write_XW(head_type);
            % build lead edge vector for written tracks of same type azimuth
        if (head_type==number_write_heads),
            % if last write head, last track written is untrimmed
            trail_edge_XW(1)=lead_edge_XW(1)+write_heads(head_type,4);
        end
        % find head edges
        head_lead_edge=read_heads(rh,3);
        head_trail_edge=head_lead_edge+read_heads(rh,4);
        for rotation_count=1:speed_wrat,
        % shift data tracks down by rotation count and current head
        % angular offset
            shifted_trail_edge_XW=trail_edge_XW-(rotation_count-
1)*track_pitch_write_360_XW - . . .
read_heads(rh,2)/360*track_pitch_write_360_XW;
            shifted_lead_edge_XW = lead_edge_XW-(rotation_count-
1)*track_pitch_write_360_XW - . . .
read_heads(rh,2)/360*track_pitch_write_360_XW;
            % calcultate conditionals to compare edges of head to
            % edges of tracks
            head_trail_GE_written_trail=(head_trail_edge>=shifted_trail_edge_XW);
            head_lead_LE_written_trail =(head_lead_edge <=shifted_trail_edge_XW);
```

-continued

```
            head_trail_GE_written_lead =(head_trail_edge>=shifted_lead_edge_XW);
            head_lead_LE_written_lead =(head_lead_edge <=shifted_lead_edge_XW);
         % evaluate them . . . some of these conditions may span 2
         % tracks, but will fail tests later on
            head_covers_trail_track        = head_trail_GE_written_trail &
head_lead_LE_written_trail;         %case #1
            head_covers_lead_track         = head_trail_GE_written_lead &
head_lead_LE_written_lead;          %case #2
            head_covers_trail_and_lead= head_covers_trail_track |
head_covers_lead_track;                  %case #3
            head_covers_entire_track       = head_covers_trail_track &
head_covers_lead_track;                  %case #4
            head_inside_track              = head_lead_LE_written_trail &
head_trail_GE_written_lead;         %case #5
         % which tracks do we see
            index_head_covers_trail_track=find(head_covers_trail_track);
            index_head_covers_lead_track=find(head_covers_lead_track);
            index_head_covers_trail_and_lead=find(head_covers_trail_and_lead);
            index_head_covers_entire_track=find(head_covers_entire_track);
            index_head_inside_track=find(head_inside_track);
         % disable empty matrix warning
            empty_list_elements_ok=1;
         % group all CAW tracks seen
            CAW_tracks_seen=remove_duplicates( . . .
                            sort([index_head_covers_trail_track . . .
                                  index_head_covers_lead_track . . .
                                  index_head_covers_trail_and_lead . . .
                                  index_head_covers_entire_track . . .
                                  index_head_inside_track]));
         % if we are on untrimmed azimuth type and head trailing
         % edge is greater than first track trailing edge, we are
         % seeing unwritten media . . . . . . . . . fail check
            if (head_type==number_write_heads),
            if (head_trail_edge > shifted_trail_edge_XW(1)),
               CAW_tracks_seen=[-1 -1 CAW_tracks_seen];
                  % add track "-1" to represent the unwritten
                  % media . . . will cause fail later
            end
         end
% rh
%CAW_tracks_seen
%index_head_inside_track
%index_head_covers_entire_track
%index_head_covers_lead_track
%index_head_covers_trail_track
         % collect statistics
         if (length(CAW_tracks_seen)>1),
            % if we saw more than 1 track number, say -1u coverage
               coverage=-1;
         elseif (length(CAW_tracks_seen)==0),
            % if we saw nothing, say 0u coverage
               coverage=0;
            % just 1 track read from here below . . . . check from
            % hghest priority to lowest
         elseif (length(index_head_covers_entire_track)),
               coverage=1000* (shifted_trail_edge_XW(CAW_tracks_seen) - . . .
                       shifted_lead_edge_XW(CAW_tracks_seen));
            % reading case#4
%disp("case#4")
         elseif (length(index_head_covers_lead_track)),
               coverage=1000* (head_trail_edge- . . .
                       shifted_lead_edge_XW(CAW_tracks_seen));
            % reading case#2
%disp("case#2")
         elseif (length(index_head_covers_trail_track)),
               coverage=1000*(shifted_trail_edge_XW(CAW_tracks_seen) - . . .
                       head_lead_edge);
            % reading case#1
%disp("case#1")
         elseif (length(index_head_inside_track)),
               coverage=(head_trail_edge-head_lead_edge)*1000;
            % reading case#5
%disp("case#5")
         else
               error("CAW collect statistics: Illegal Conditional!");
         end
```

-continued

```
            % enable empty matrix warning
            empty_list_elements_ok="warn";
            caw_coverage (rh, rotation_count)=coverage;
        end % rotation_count
    end    % rh
    h1_vxa_plot=caw_coverage;
end    % if caw_simulation
if (caw_simulation == 0),
% ######################################## Read Scans
########################################
% For written length of tape, how many read scans do we need to cover length
    number_of_read_scans=fix(tape_used_X/tape_speed_read/drum_T_read*1.05);
% (N) number of read scans needed - pad by 5% for margin
% If read scanning at a different angle, calculate how much of a
% position deviation (_XW axis) we
% incurr over 180-deg and then 001-deg. This is deviation from
% nominal 1 Track Pitch over 360-degree period.
% The _XW coordinate system is designed such that scanning at
% the same angle the track was written at results in no net
% deviation in the _XW direction after the scan has started.
% i.e. all packets would have the same _XW coordinate
delta_track_pitch_read_180_XW=track_length_write_YW*tan(deg2rad(scan_angle_rea
d_XY-scan_angle_write_XY));          % (mm)
    delta_track_pitch_read_001_XW=delta_track_pitch_read_180_XW/180;
% (mm) mm deviation from written track per degree of rotation
% ######## First head setup (head at 0-deg rotation, 0u position)
% Calculate the first heads trailing edge position at 0-deg rotation
% This is determined by the calculation on how far this edge
% moves per rotation
% This matrix has a row for every packet number
    h1_trailing_edge_position_XW=ones(number_of_track_packets,1) *
[(0:number_of_read_scans-1)*track_pitch_read_360_XW];        % (mm)
% Calculate horizontal offset from beginning of scan as we
% scan down track on a packet basis (if unequal scan angles,
% otherwise all zero)
delta_packet_offset_XW=packet_rotational_coordinate_YW'*delta_track_pitch_read
_001_XW;        % (mm)
% Modify every column of the head position array with these offsets
    h1_trailing_edge_position_XW= h1_trailing_edge_position_XW +
(delta_packet_offset_XW * ones(1,number_of_read_scans));
%h1_trailing_edge_position_XW(1:10,1:10)
% ############### Loop through all READ heads and compute read scans
    for rh=1:number_read_heads,
        wh=read_heads(rh,1);
            % get azimuth of this read head . . . . . that is
            % index into write heads data
            % get trailing edge positions of read scans
            % (head 1 is "reference" position calculated above)
        if (rh == 1),
            hx_trailing_edge_position_XW=h1_trailing_edge_position_XW;
        else
            % Adjust trailing edge positions based on vertical
            % head position and rotational position of head
            hx_trailing_edge_position_XW= h1_trailing_edge_position_XW +
read_heads(rh,3) + read_heads(rh,2) *track_pitch_read_360_XW/360;
        end
        % ####### Find relationship between this trailing edge of the
        % scan and the written track pairs/triplets/etc.
        %        (relative head placement)
        hx_relative_position_XW =
rem(hx_trailing_edge_position_XW,track_pitch_write_XW);
        % compute desired track coverage based on on-track-percentage requirement
            read_percentage=track_width_write_XW(wh)*on_track_percentage/100;
        % ####### Calculate boundaries for the readable data edges
            tla=sum(track_width_write_XW(1:wh))-track_width_write_XW(wh);
% Find Trailing Edge (closest to 0) position of Relative Track 1
            l1a=t1a+read_percentage;
% Find Leading Edge of first "readable" segment of track
            l1b=t1a+track_width_write_XW(wh);
% Find Leading Edge of second readable segment of Relative Track 1
            t1b=l1b-read_percentage;
% Find Trailing Edge of second readable segment
            t2=t1a+track_pitch_write_XW;
% Find Trailing Edge position of Relative Track 2
            l2=t2+read_percentage;
% Find Leading Edge of readable segment on Relative Track 2
            t3=t2+track_pitch_write_XW;
```

-continued

```
% Find Trailing Edge position of Relative Track 3 (not to be read,
%               but used to check for like-azimuth interferance)
    hx_t=hx_relative_position_XW;
% Relative Trailing Edge positions of read scans
    hx_1=hx_t+read_heads(rh,4);
% Relative Leading Edge positions of read scans
    % Apply read scan conditionals and flag result with "1" for
    % sucessful read of Relative Track 1, "2" for Relative Track 2
    hx_read_scan_flag=(     (hx_t<=t1a & hx_1>=11a & hx_1<t2) | ...
                            (hx_t<=t1b & hx_1>=11b & hx_1<t2) ) + ...
                      2* (hx_t>11b & hx_1>=12 & hx_1<t3);
    % For non-zero read scan flags (i.e. read a packet on some
    % track), calculate the actual track number read
    hx_read_scan_track_numbers=fix( ( (hx_read_scan_flag>0) . *
hx_trailing_edge_position_XW)/track_pitch_write_XW ) + hx_read_scan_flag;
    % Take the track number scan matrix and accumulate into
    % VXA plot for this head
    % rows represent packet numbers, columns represent written track number
    hx_vxa_plot=vxa_matrix(hx_read_scan_track_numbers);
    % trim off pad tracks
    if columns(hx_vxa_plot)==0,
hx_vxa_plot=zeros(number_of_track_packets, number_of_track_groups_pad+number_of
_simulation_track_groups);
    end
    if
columns(hx_vxa_plot)<number_of_track_groups_pad+number_of_simulation_track_gro
ups,
    hx_vxa_plot=[hx_vxa_plot
zeros(number_of_track_packets,number_of_track_groups_pad+number_of simulation_
track_groups - columns(hx_vxa_plot))];
    end
hx_vxa_plot=hx_vxa_plot(:,number_of_track_groups_pad+1:number_of_track_groups_
pad+number_of_simulation_track_groups);
    % Done with this head. . . . . .stash it away
    if rh==1,
        h1_vxa_plot=hx_vxa_plot;
    elseif rh==2,
        h2_vxa_plot=hx_vxa_plot;
    elseif rh==3,
        h3_vxa_plot=hx_vxa_plot;
    elseif rh==4,
        h4_vxa_plot=hx_vxa_plot;
    elseif rh==5,
        h5_vxa_plot=hx_vxa_plot;
    elseif rh==6,
        h6_vxa_plot=hx_vxa_plot;
    elseif rh==7,
        h7_vxa_plot=hx_vxa_plot;
    elseif rh==8,
        h8_vxa_plot=hx_vxa_plot;
    elseif rh==9,
        h9_vxa_plot=hx_vxa_plot;
    elseif rh==10,
        h10_vxa_plot=hx_vxa_plot;
    elseif rh>10,
        disp("vxa: Warning, cannot store more than 10 hx_vxa_plot's \n");
    end
    end         % end rh loop
end % if caw_simulation ==0
endfunction
/* This function takes a matrix of read scan results and bins all
   successful packets read according to packet number and track number read.
   The function takes a matrix (packet, read_scan) of data and reduces it to
   a VXA plot matrix of similar structure.
   The row numbers of the read scan matrix represent successive packet
   numbers and the column numbers are successive read scans. If a non-zero
   number is in the matrix of data, that represents track id number of a
   successful read of the appropriate packet number.
   This function builds a return matrix that has the same number of rows,
   representing packet numbers, but the columns now represent written track
   id numbers. If a certain packet is read once, a "1" will be stored in
   matrix, twice a "2" will be stored, etc.
   Called from octave:
       vxa_output=vxa_matrix(read_scan_matrix);
*/
```

-continued

```
#include <octave/oct.h>
// Include display output
//#include <iostream.h>
//#include <octave/pager.h>
//#include <octave/symtab.h>
//#include <octave/variables.h>
DEFUN_DLD (vxa_matrix, args, nargout, "vxa_matrix")
{
   octave_value_list retval;
   octave_value arg0;
   int num_argout;
   Matrix read_scan_matrix;
   int number_packets;
   int number_read_scans;
   int number_written_tracks;
   int i,j;
   arg0 = args(0);          // get first argument address
   num_argout=nargout;      // get number of arguments passed out
   // define read scan matrix passed in and get its size
   read_scan_matrix = arg0.matrix_value ( );
   number_packets  =read_scan_matrix.rows ( );
   number_read_scans=read_scan_matrix.columns ( );
   // find maximum written track id number
   number_written_tracks=0;
   for (i=0; i<number_read_scans; i++)
      {
        for (j=0; j<number_packets; j++)
           {
             if (read_scan_matrix(j,i)>number_written_tracks)
                { number_written_tracks=(int)read_scan_matrix(j,i);
                }
           }
      }
   // allocate matrix space for "number_packets" rows, "number_written_tracks"
columns
   Matrix vxa_track_matrix (number_packets,number_written_tracks);
   // and zero it out
   for (i=0; i<number_written_tracks; i-+)
      {
        for (j=0; j<number_packets; j++)
           { vxa_track_matrix(j,i)=0;
           }
      }
   // loop through read scan matrix and increment vxa_track_matrix entries
   for (i=0; i<number_read_scans; i++)
      {
        for (j=0; j<number_packets; j++)
           {
             if ((int)read_scan_matrix(j,i) != 0)
                { vxa_track_matrix(j, (int)read_scan_matrix(j,i)-1)++;
                }
           }
      }
// octave_stdout << number_packets << " " << number_read_scans << " " <<
number_written_tracks << "\n";
   retval (0) = octave_value (vxa_track_matrix);
   return retval;
}
```

Certain undefined functions and declarations are obvious to those skilled in the art and need not be presented herein in further detail.

FIG. 5 is a sample plot generated from output of the above simulation function using well known data presentation tools such as Microsoft Excel. The plot of FIG. 5 shows a two dimensional array of parameter setting. One axis represents possible tape speed variance values while the other axis represents possible head offset spacing values in the simulation. Other parameters of the simulation are fixed and annotated on the plot. For example, the number of heads was fixed at four (two A heads and two B heads) and the gap width of those heads was selected as 15 microns and a track width of 9 microns. Each position of the two dimensional array is shaded for simplicity as black or white. Shaded black cells in the matrix are not useful settings for the overscan purposes of the present invention. Unshaded (white) boxes represent potentially useful settings.

As can be easily seen from the plot of FIG. 5, a wide range of head offset spacing values may be used to provide adequate coverage to read tape media at full 1X speed (as well as slower speeds). Some parameter settings shown as useful in the plot of FIG. 5 may particular benefits in particular applications. The preferred dimensions as presented herein are chosen to allow significant flexibility in operating at 1X speed and lower.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A method for evaluating parameters of a drum design of a drum for use in a helical scan tape device comprising the steps of:
   (a) receiving said parameters wherein said parameters include a position of a first read head on said drum, said first read head sensing data recorded along a first azimuth;
   (b) selecting a track of predetermined dimensions from a plurality of tracks;
   (c) simulating a reading of said selected track by calculating a first read head coverage comprising a first geometric area of the selected track that would be covered by said first read head as said first read head scans over said selected track;
   (d) determining that the simulated read is successful when a ratio of said first read head coverage to a total geometric track area of the selected track as defined by the predetermined dimensions of the selected track is greater than a predetermined coverage threshold value;
   (e) repeating steps (b) through (d) for each of said plurality of tracks; and
   (f) determining that said parameters are effective for said drum design when a number of said plurality of tracks for which the simulated read was determined to be successful is greater than a predetermined error rate threshold value.

2. The method of claim 1 wherein said parameters include a position of a second read head on said drum, and
   wherein the step of simulating comprises calculating a combined head coverage comprising a geometric area of the selected track that would be covered by said first read head and by said second read head as each of the first read head and the second read head scan over said selected track, said first read head sensing data recorded along a first azimuth, and
   said determining step comprises determining that the simulated read is successful when a ratio of said combined head coverage to said total geometric area is greater than a predetermined combined coverage threshold value.

3. The method of claim 1 wherein said parameters include positions of a plurality of read heads on said drum, and
   wherein the step of simulating comprises calculating a combined head coverage comprising a geometric area of the selected track that would be covered by said plurality of read heads as each of the plurality of read heads scan over said selected track, and
   said determining step comprises determining that the simulated read is successful when a ratio of said combined head coverage to said total geometric area is greater than a predetermined combined coverage threshold value.

4. The method of claim 1 wherein said parameters include a nominal tape speed and wherein the method further comprises the steps of
   (g) varying a tape speed from said nominal tape speed parameter value to generate an alternate tape speed value; and
   (h) repeating steps (b) through (g) for each of a plurality of alternate tape speed values.

5. The method of claim 4 wherein said the step of varying comprises the step of:
   generating an alternate tape speed values as values less than or equal to 1X speed of said tape device.

6. The method of claim 1 wherein said parameters include a nominal gap width and wherein the method further comprises the steps of:
   (g) varying gap width from said nominal gap width parameter value to generate an alternate gap width value; and
   (h) repeating steps (b) through (g) for each of a plurality of alternate gap width values.

7. The method of claim 1 wherein said parameters include a nominal head offset spacing and wherein the method further comprises the steps of:
   (g) varying a head offset spacing from said nominal head offset spacing parameter value to generate an alternate head offset spacing value; and
   (h) repeating steps (b) through (g) for each of a plurality of alternate head offset spacing values.

8. A method for evaluating parameters of a drum design of a drum for use in a helical scan tape device comprising the steps of:
   (a) receiving said parameters wherein said parameters, include a position of a first read head on said drum and a position of a second read head on said drum, said first read head sensing data recorded along a first azimuth and said second read head sensing data recorded along said first azimuth;
   (b) selecting a track of predetermined dimensions from a plurality of tracks;
   (c) simulating a reading of said selected track by calculating a first read head coverage comprising a first geometric area of the selected track that would be covered by said first read head as said first read head scans over said selected track and calculating a second read head coverage comprising a second geometric area of the selected track that would be covered by said second read head as said second read head scans over said selected track;
   (d) determining that the simulated read is successful when either a first ratio of said first read head coverage to a total geometric track area of the selected track as defined by the predetermined dimensions of the selected track is greater than a predetermined coverage threshold value, or a second ratio of said second read head coverage to the total geometric track area of the selected track as defined by the predetermined dimensions of the selected track is greater than said predetermined coverage threshold value;
   (e) repeating steps (b) through (d) for each of said plurality of tracks; and
   (f) determining that said parameters are effective for said drum design when a number of said plurality of tracks for which the simulated read was determined to be successful is greater than a predetermined error rate threshold value.

9. The method of claim 8 wherein said parameters include a tape speed and wherein the method further comprises the steps of:
   (g) varying said tape speed from said a nominal tape speed parameter value to generate an alternate tape speed value; and
   (h) repeating steps (b) through (g) for each of a plurality of alternate tape speed values.

10. The method of claim 9 wherein said alternate tape speed values comprise a tape speed of less than or equal to a 1X speed of said tape device.

11. The method of claim 8 wherein said parameters include a gap width and wherein the method further comprises the steps of:
(g) varying said gap width from a nominal gap width value to generate an alternate gap width value; and
(h) repeating steps (b) through (g) for each of a plurality of alternate gap width values.

12. A drum evaluation simulator which evaluates parameters of a drum design for use in a helical scan tape device comprising:
a parameter receiving element for receiving said parameters wherein said parameters include a position of a first read head on said drum;
a track selection element which selects a track of predetermined dimensions from a plurality of tracks;
a read simulation element which simulates a reading of a the selected track by calculating a first read head coverage comprising a first geometric area of the track that would be covered by said first read head as said first read head scans over said selected track; and
a coverage determination element which determines a ratio of said first read head coverage to a total geometric track area of the track as defined by the predetermined dimensions of the selected track and determines that the simulated reading is successful when the ratio is greater than a predetermined coverage threshold value; and
a parameter evaluator which indicates that said received parameters are effective for said drum design when a number of successful simulated readings of a plurality of selected tracks reaches a predetermined threshold.

13. The drum evaluation simulator of claim 12 wherein said parameters includes a position of a second read head on said drum, and
wherein the read simulation element simulates the reading of said selected track by calculating a combined head coverage comprising a geometric area of the track that would be covered by said first read head and by said second read head as each of the first read head and the second read head scan over the selected track, said first read head sensing data recorded along a first azimuth, and
wherein the coverage determination element determines a combined head ratio of said combined head coverage to said total geometric track area and determines that the simulated reading is successful when said combined head ratio is greater than a predetermined coverage threshold value.

14. The drum evaluation simulator of claim 12 wherein said parameters include positions of a plurality of read heads on said drum, and
wherein the read simulation element simulates the reading of said selected track by calculating a combined head coverage comprising a geometric area of the track that would be covered by said plurality of read heads as each of the plurality of read heads scan over said selected track, and
wherein the coverage determination element determines a combined head ratio of said combined head coverage to said total geometric track area and determines that the simulated reading is successful when said combined head ratio is greater than a predetermined coverage threshold value.

15. The drum evaluation simulator of claim 12 wherein said parameters include a tape speed and wherein:
the read simulation element varies a said tape speed from a nominal tape speed value to generate at least one alternate tape speed value, and simulates the reading of the selected track at the at least one alternate tape speed value.

16. The drum evaluation simulator of claim 15 wherein said at least one alternate tape speed value comprise a tape speed of less than or equal to the nominal tape speed of said tape device.

17. The drum evaluation simulator of claim 12 wherein said parameters include a gap width and wherein:
the read simulation element varies said gap width from a nominal gap width value to generate at least one alternate gap width value, and simulates the reading of the selected track based on the at least one alternate gap width value 18. The drum evaluation simulator of claim 12 wherein said parameters include a nominal head offset spacing and wherein:
the read simulation element varies said head offset spacing from a nominal head offset spacing value to generate at least one alternate head offset spacing value, and simulates the reading of the selected track at the at least one alternate head offset spacing value.

* * * * *